US006147742A

United States Patent [19]

Bell et al.

[11] Patent Number: 6,147,742

[45] Date of Patent: *Nov. 14, 2000

[54] PHOTOFINISHING SYSTEM AND METHOD FOR AUTOMATED ADVANCED SERVICES INCLUDING IMAGE AND ASSOCIATED AUDIO DATA PROCESSING

[75] Inventors: Cynthia S. Bell; David L. Patton, both of Webster; Stephen J. Rowan, Spencerport; Wayne F. Niskala; Arthur A. Whitfield, both of Rochester, all of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/031,173

[22] Filed: Feb. 26, 1998

[51] Int. Cl.[7] .......................... G03B 27/32; G03B 27/52

[52] U.S. Cl. .............................................. 355/27; 355/40

[58] Field of Search ................................ 355/27, 40, 41, 355/77; 396/564, 568, 569, 639

[56] References Cited

U.S. PATENT DOCUMENTS

| | | | |
|---|---|---|---|
| 5,128,700 | 7/1992 | Inoue et al. | 396/312 |
| 5,218,455 | 6/1993 | Kristy | 358/403 |
| 5,276,472 | 1/1994 | Bell et al. | 396/312 |
| 5,363,157 | 11/1994 | Cocca | 396/312 |
| 5,363,158 | 11/1994 | Stoneham | 396/312 |
| 5,387,955 | 2/1995 | Cocca | 396/312 |
| 5,389,989 | 2/1995 | Hawkins et al. | 396/315 |
| 5,521,663 | 5/1996 | Norris, III | 396/312 |
| 5,546,196 | 8/1996 | Huot et al. | 358/527 |
| 5,633,678 | 5/1997 | Parulski et al. | 348/232 |
| 5,633,726 | 5/1997 | Timmermans | 386/70 |
| 5,649,260 | 7/1997 | Wheeler et al. | 396/569 |
| 5,664,253 | 9/1997 | Meyers | 396/603 |
| 5,774,752 | 6/1998 | Bell et al. | 396/312 |

FOREIGN PATENT DOCUMENTS 0 809 149 11/1997 European Pat. Off. .

*Primary Examiner*—D. Rutledge
*Attorney, Agent, or Firm*—Francis H. Boos, Jr.; Roland R. Schindler, II

[57] ABSTRACT

A photofinishing system for automatically processing image and associated image data pursuant to customer output requests. The system includes an order manager operative to receive and control processing of the output requests and at least one source of image related data corresponding to the output request. An input interface receives the image related data from the source and converts the data to a digital data stream. A memory is included for storing the digital data stream. The system further includes a data parser disposed in communication with the memory to extract selected data streams according to the order manager and to reduce the data into respective image files having respective groups of data fields. An output module is responsive to the order manager and is operative to produce a photofinished output organized with respect to the data fields.

31 Claims, 24 Drawing Sheets

| WRITE ELEMENT # | LUT CORR'N* | LUT OFFSET |
|---|---|---|
| ↓ 1 | *1 | 0 |
| 2 | *1 | 0 |
| 3 | 1 | 0 |
| 4 | .82 | 0 |
| 5 | 1 | 0 |
| 6 | 1 | 0 |
| 7 | 1 | 0 |
| n | .7 | +.13 |
| ni | 1.22 | 0 |
| nj | 1 | 0 |
| n | 1 | +.05 |

FIG.11A

| FROM ORIGINATION SOURCE | | | | | USER SPECIFIED | | | FROM CAMERA |
|---|---|---|---|---|---|---|---|---|
| FILE TYPE | DATE/TIME CAPTURED | BATCH ID # | FRAME ID # | DURATION, SEC | GROUP LEAD | CATEGORY | SERIES ID | AUDIO-IMAGE LINK |
| JPEG | 5/11/97 10:32:44 | 571349 | 1 | | | | | 571349:1 |
| JPEG | 5/11/97 10:33:04 | 571349 | 2 | | | | | 571349:2 |
| JPEG | 5/11/97 10:36:13 | 571349 | 3 | | Y | | | 571349:3 |
| JPEG | 5/11/97 10:39:20 | 571349 | 4 | | | | | 571349:4 |
| JPEG | 5/11/97 10:40:01 | 571349 | 5 | | | | | 571349:5 |
| JPEG | 5/11/97 14:55:29 | 571349 | 23 | | | | | 571349:23 |
| JPEG | 5/11/97 15:02:31 | 571349 | 24 | | | | | 571349:24 |
| WAV | 5/11/97 10:32:35 | 571349 | 1 | 8.02 | | | | 571349:1 |
| WAV | 5/11/97 10:32:56 | 571349 | 2 | 7.06 | | | | 571349:2 |
| WAV | 5/11/97 10:36:05 | 571349 | 3 | 7.00 | | | | 571349:3 |
| JPEG | 5/10/97 8:30:28 | 572022 | 28 | | | OUR KIDS | | 134728:10 |
| JPEG | 5/10/97 10:33:32 | 572022 | 27 | | | AMBIANCE | | 134728:11 |
| JPEG | 5/10/97 11:02:16 | 572022 | 26 | | | AMBIANCE | | 134728:12 |
| JPEG | 5/10/97 14:12:42 | 572022 | 25 | | | AMBIANCE | | 134728:13 |

FIG.11B

| FROM ORIGINATION SOURCE | | | | | | USER SPECIFIED | | | FROM CAMERA |
|---|---|---|---|---|---|---|---|---|---|
| FILE TYPE | DATE/ TIME | CAP-TURED | BATCH ID # | FRAME ID # | DURA-TION, SEC | GROUP LEAD | CATEGORY | SERIES ID | AUDIO-IMAGE LINK |
| JPEG | 5/10/97 | 14:31:03 | 572022 | 22 | | | ACTIVITIES | | 134728:16 |
| JPEG | 5/10/97 | 14:40:43 | 572022 | 21 | | | ACTIVITIES | | 134728:17 |
| JPEG | 5/10/97 | 14:43:27 | 572022 | 20 | | | ACTIVITIES | | 134728:18 |
| JPEG | 5/10/97 | 15:10:12 | 572022 | 19 | | | ACTIVITIES | | 134728:19 |
| JPEG | 5/10/97 | 15:21:50 | 572022 | 18 | | | ACTIVITIES | | |
| JPEG | 5/10/97 | 16:46:58 | 572022 | 7 | | | SCENERY | | 134603:6 |
| JPEG | 5/10/97 | 16:47:16 | 572022 | 6 | | | SCENERY | | 134603:7 |
| JPEG | 5/11/97 | 10:33:32 | 572022 | 5 | | | OUR KIDS | | 134603:8 |
| JPEG | 5/11/97 | 10:36:21 | 572022 | 4 | | | OUR KIDS | | 134603:9 |
| JPEG | 5/11/97 | 10:36:42 | 572022 | 3 | | | OUR KIDS | | 134603:10 |
| WAV | 5/11/97 | 10:36:16 | 134603 | 9 | 5.09 | | | | 572022:4 |
| WAV | 5/11/97 | 10:36:32 | 134603 | 10 | 11.26 | | | | 572022:3 |
| WAV | 5/11/97 | 10:36:37 | 134603 | 11 | 10.03 | | | | 572022:2 |
| WAV | 5/11/97 | 10:40:25 | 134603 | 12 | 6.16 | | | | 572022:1 |

FIG. 13

| FROM ORIGINATION SOURCE | | | | | | USER SPECIFIED | | | FROM CAMERA |
|---|---|---|---|---|---|---|---|---|---|
| FILE TYPE | DATE/ TIME | CAP- TURED | BATCH ID # | FRAME ID # | DURA- TION, SEC | GROUP LEAD | CATEGORY | SERIES ID | AUDIO- IMAGE LINK |
| JPEG | 5/10/97 | 6:40:34 | 572022 | 37 | | | OUR KIDS | | 134728:1 |
| JPEG | 5/10/97 | 6:41:23 | 572022 | 36 | | | OUR KIDS | | 134728:2 |
| JPEG | 5/10/97 | 6:41:43 | 572022 | 35 | | | OUR KIDS | | 134728:3 |
| JPEG | 5/10/97 | 6:44:52 | 572022 | 34 | | | OUR KIDS | | 134728:4 |
| JPEG | 5/10/97 | 6:47:59 | 572022 | 33 | | | OUR KIDS | | 134728:5 |
| JPEG | 5/10/97 | 15:29:45 | 572022 | 17 | | | ACTIVITIES | | 134728:20 |
| JPEG | 5/10/97 | 15:38:47 | 572022 | 16 | | | ACTIVITIES | | 134728:21 |
| JPEG | 5/10/97 | 15:58:26 | 572022 | 15 | | | ACTIVITIES | | 134728:22 |
| JPEG | 5/10/97 | 16:03:39 | 572022 | 14 | | Y | ACTIVITIES | | 134728:23 |
| JPEG | 5/10/97 | 16:10:41 | 572022 | 13 | | | ACTIVITIES | | 134728:24 |
| JPEG | 5/11/97 | 14:30:37 | 571349 | 21 | | | | | 571349:21 |
| JPEG | 5/11/97 | 14:50:16 | 571349 | 22 | | | | | 571349:22 |
| JPEG | 5/11/97 | 14:55:29 | 571349 | 23 | | | | | 571349:23 |
| JPEG | 5/11/97 | 15:02:31 | 571349 | 24 | | | | | 571349:24 |

FIG.14A

| FROM ORIGINATION SOURCE | | | | | USER SPECIFIED | | | FROM CAMERA | | |
|---|---|---|---|---|---|---|---|---|---|---|
| | | | | | | | | | | IMAGE |
| FILE TYPE | DATE/TIME CAPTURED | BATCH ID # | FRAME ID # | DURATION, SEC | GROUP LEAD | CATEGORY | SERIES ID | AUDIO-IMAGE LINK | SERIES? | GROUP ID |
| JPEG | 5/10/97 6:51:30 | 572022 | 31 | | | OUR KIDS | | 134728:7 | | 1 |
| JPEG | 5/10/97 7:17:43 | 572022 | 30 | | | OUR KIDS | | 134728:8 | | 2 |
| JPEG | 5/10/97 8:30:10 | 572022 | 29 | | | OUR KIDS | | 134728:9 | | 3 |
| JPEG | 5/10/97 8:30:28 | 572022 | 28 | | | OUR KIDS | | 134728:10 | | 3 |
| JPEG | 5/10/97 10:33:32 | 572022 | 27 | | | AMBIANCE | | 134728:11 | | 4 |
| JPEG | 5/10/97 14:20:49 | 572022 | 23 | | | ACTIVITIES | | 134728:15 | | 6 |
| JPEG | 5/10/97 14:31:03 | 572022 | 22 | | | ACTIVITIES | | 134728:16 | | 6 |
| JPEG | 5/10/97 14:40:43 | 572022 | 21 | | | ACTIVITIES | | 134728:17 | | 6 |
| JPEG | 5/10/97 14:43:27 | 572022 | 20 | | | ACTIVITIES | | 134728:18 | | 6 |
| JPEG | 5/10/97 15:10:12 | 572022 | 19 | | | ACTIVITIES | | 134728:19 | | 7 |
| JPEG | 5/10/97 16:47:16 | 572022 | 6 | | | SCENERY | | 134603:7 | | 8 |
| JPEG | 5/11/97 10:32:44 | 571349 | 1 | | | | | 571349:1 | | 9 |
| JPEG | 5/11/97 10:33:04 | 571349 | 2 | | | | | 571349:2 | | 9 |
| JPEG | 5/11/97 10:33:32 | 572022 | 5 | | | OUR KIDS | | 134603:8 | | 10 |

| FILE TYPE | DATE/ TIME | CAP- TURED | BATCH ID # | FRAME ID # | DURA- TION, SEC | GROUP LEAD | CATEGORY | SERIES ID | AUDIO- IMAGE LINK | SERIES? | GROUP ID |
|---|---|---|---|---|---|---|---|---|---|---|---|
| JPEG | 5/11/97 | 10:36:13 | 571349 | 3 | | Y | | | 571349:3 | | 11 |
| JPEG | 5/11/97 | 10:36:21 | 572022 | 4 | | | OUR KIDS | | 134603:9 | | 12 |
| JPEG | 5/11/97 | 10:36:42 | 572022 | 3 | | | OUR KIDS | | 134603:10 | | 12 |
| JPEG | 5/11/97 | 10:36:46 | 572022 | 2 | | | OUR KIDS | | 134603:11 | | 12 |
| JPEG | 5/11/97 | 10:39:20 | 571349 | 4 | | | | | 571349:4 | | 13 |
| JPEG | 5/11/97 | 14:21:35 | 571349 | 20 | | | | | 571349:20 | | 16 |
| JPEG | 5/11/97 | 14:30:37 | 571349 | 21 | | | | | 571349:21 | | 16 |
| JPEG | 5/11/97 | 14:50:16 | 571349 | 22 | | | | | 571349:22 | | 16 |
| JPEG | 5/11/97 | 14:55:29 | 571349 | 23 | | | | | 571349:23 | | 16 |
| JPEG | 5/11/97 | 15:02:31 | 571349 | 24 | | | | | 571349:24 | | 16 |

FIG.14B

| | |
|---|---|
| FIG. 15A1 | FIG. 15A2 |

FIG. 15A

FIG.15A1

| FROM ORIGINATION SOURCE | | | | | | USER SPECIFIED | | |
|---|---|---|---|---|---|---|---|---|
| FILE TYPE | DATE/ TIME | CAP- TURED | BATCH ID # | FRAME ID # | DURA- TION, SEC | GROUP LEAD | CATEGORY | SERIES ID |
| JPEG | 5/10/97 | 6:51:30 | 572022 | 31 | | | OUR KIDS | |
| JPEG | 5/10/97 | 7:17:43 | 572022 | 30 | | | OUR KIDS | |
| JPEG | 5/10/97 | 8:30:10 | 572022 | 29 | | | OUR KIDS | |
| JPEG | 5/10/97 | 8:30:28 | 572022 | 28 | | | OUR KIDS | |
| JPEG | 5/10/97 | 10:33:32 | 572022 | 27 | | | AMBIANCE | |
| JPEG | 5/10/97 | 16:20:18 | 572022 | 9 | | | AMBIANCE | |
| JPEG | 5/10/97 | 16:46:31 | 572022 | 8 | | | SCENERY | |
| JPEG | 5/10/97 | 16:46:58 | 572022 | 7 | | | SCENERY | |
| JPEG | 5/10/97 | 16:47:16 | 572022 | 6 | | | SCENERY | |
| JPEG | 5/11/97 | 10:32:44 | 571349 | 1 | | | | |
| JPEG | 5/11/97 | 10:36:46 | 572022 | 2 | | | OUR KIDS | |
| JPEG | 5/11/97 | 10:39:20 | 571349 | 4 | | | | |
| JPEG | 5/11/97 | 10:40:01 | 571349 | 5 | | | | |
| JPEG | 5/11/97 | 10:40:30 | 572022 | 1 | | Y | OUR KIDS | |

FIG.15A2

| FROM CAMERA | | | |
|---|---|---|---|
| | IMAGE | | |
| AUDIO-IMAGE LINK | SERIES? | GROUP ID | GROUP LEAD |
| 134728:7 | | 1 | |
| 134728:8 | | 2 | Y |
| 134728:9 | Y | 3 | Y |
| 134728:10 | Y | 3 | |
| 134728:11 | | 4 | Y |
| 134603:4 | | 7 | |
| 134603:5 | Y | 8 | Y |
| 134603:6 | Y | 8 | |
| 134603:7 | Y | 8 | |
| 571349:1 | Y | 9 | Y |
| 134603:11 | Y | 12 | |
| 571349:4 | Y | 13 | Y |
| 571349:5 | Y | 13 | |
| 134603:12 | | 14 | Y |

| FILE TYPE | DATE/TIME CAPTURED | BATCH ID # | FRAME ID # | DURATION, SEC | GROUP LEAD | CATEGORY | SERIES ID | AUDIO-IMAGE LINK | SERIES? | GROUP ID | GROUP LEAD |
|---|---|---|---|---|---|---|---|---|---|---|---|
| JPEG | 5/11/97 10:42:51 | 571349 | 6 | | | | | 571349:6 | | 15 | Y |
| JPEG | 5/11/97 11:09:04 | 571349 | 7 | | | | | 571349:7 | Y | 15 | |
| JPEG | 5/11/97 11:09:31 | 571349 | 8 | | | | | 571349:8 | Y | 15 | |
| JPEG | 5/11/97 11:09:49 | 571349 | 9 | | | | | 571349:9 | Y | 15 | |
| JPEG | 5/11/97 13:12:53 | 571349 | 10 | | | | Y | 571349:10 | | 16 | Y |
| JPEG | 5/11/97 13:15:42 | 571349 | 11 | | | | Y | 571349:11 | Y | 16 | |
| JPEG | 5/11/97 13:16:03 | 571349 | 12 | | | | Y | 571349:12 | Y | 16 | |
| JPEG | 5/11/97 13:16:07 | 571349 | 13 | | | | Y | 571349:13 | Y | 16 | |
| MPEG | 5/11/97 13:19:51 | 571349 | 14 | 176.21 | | | | 571349:14 | | 16 | |
| JPEG | 5/11/97 13:22:53 | 571349 | 15 | | | | | 571349:15 | | 16 | |
| JPEG | 5/11/97 13:32:33 | 571349 | 16 | | | | | 571349:16 | | 16 | |
| JPEG | 5/11/97 13:35:17 | 571349 | 17 | | | | | 571349:17 | | 16 | |
| MPEG | 5/11/97 14:02:02 | 571349 | 18 | 305.39 | | | | 571349:18 | | 16 | |
| JPEG | 5/11/97 14:13:40 | 571349 | 19 | | | | | 571349:19 | | 16 | |
| JPEG | 5/11/97 14:21:35 | 571349 | 20 | | | | | 571349:20 | | 16 | |
| JPEG | 5/11/97 14:30:37 | 571349 | 21 | | | | | 571349:21 | | 16 | |
| JPEG | 5/11/97 14:50:16 | 571349 | 22 | | | | | 571349:22 | | 16 | |
| JPEG | 5/11/97 14:55:29 | 571349 | 23 | | | | | 571349:23 | | 16 | |
| JPEG | 5/11/97 15:02:31 | 571349 | 24 | | | | | 571349:24 | | 16 | |

FIG.15B

PHOTOFINISHING SYSTEM AND METHOD FOR AUTOMATED ADVANCED SERVICES INCLUDING IMAGE AND ASSOCIATED AUDIO DATA PROCESSING

FIELD OF THE INVENTION

The invention relates to a system and method for photofinishing and more particularly an automatic photofinishing system and method for managing and processing audio data and image data.

BACKGROUND OF THE INVENTION

The increased use of computers in many aspects of photography offers a pathway to deliver a higher level of service for consumers. Many consumers often prefer to capture pictures with conventional film-to-print photo systems, while others prefer movie cameras, camcorders or modern digital cameras. New modes of utilizing images are becoming increasingly popular with varying forms of communication. Common utilization modes include distributing e-mail with images and related audio on the World Wide Web, sharing images by electronic display (television), manipulating images electronically, and archiving images for subsequent retrieval.

The image applications described above typically require a consumer to expend substantial time to ensure proper processing of the images. However, many consumers often lack the time to fully explore and take advantage of the various image utilization opportunities available. Thus, in spite of new options for processing images, consumers may not get involved with such opportunities. A more automated means of processing consumer images is highly desirable to relieve the time burden associated with image utilization and management.

Several proposals for photo systems including media integral with the film for data recording have been disclosed, necessitating advanced photofinishing techniques. One proposal, by Bell et al. in U.S. Pat. No. 5,276,472 describes film having an integral magnetic layer for storing additional data such as audio. The data is read magnetically during photofinishing and written to each print for subsequent playback when prints are viewed.

Similar proposals to the Bell photo system described above are disclosed by Stoneham (U.S. Pat. No. 5,363,158), Cocca (U.S. Pat. No. 5,363,157), Norris (U.S. Pat. No. 5,521,663), and Hawkins et al. (U.S. Pat. No. 5,389,989). These patents describe cameras that record conventional images as well as audio data. The cameras generally contain an optical recording module that enables data, such as audio, to be written as a latent image onto the film. This is in addition to the normal capture of conventional images formed from ambient light passing through the camera's lens. The optical recording module typically includes a column of LED's to expose digital data onto the film. The audio is recorded immediately adjacent to each image captured, or buffered and written to the film following all image captures.

In one advanced photofinishing technique for processing APS film, an APS camera may utilize APS IX magnetic data tracks to detect when audio data has been captured. This provides a photofinisher with audio to image correlation information at processing. However, solutions to enable a photofinisher to process and manage film having images plus data, such as audio data, have not yet been adequately described.

Photo systems that integrate audio data separate from the film have also been proposed. Such a two media system is described in U.S. Pat. No. 5,128,700 to Inoue. This photo system includes a camera utilizing both film and a memory card. The film captures images while the memory card records audio data. In practice, the two mediums are maintained in the possession of the photographer who must avoid mixing audio with the wrong images. Photofinishing for this photo system comprises conventional methods.

Following photofinishing, the prints are returned to the customer, who then inserts the finished prints and the data memory card into a special playback device to view the print while hearing its audio. Thus, for this approach, no advanced photofinishing services are enabled or required. Therefore, the need exists for a photofinishing system and method for managing and sequencing the audio data that is integrated with the images on the same storage media. This is the case for images and audio jointly recorded on film and for transmitted data streams of digital images with audio from digital image sources. Further, the need exists for a photofinishing system and method for managing and sequencing groups of orders for photofinishing services that result in an integrated image and audio product. The system and method of the present invention satisfies these needs.

SUMMARY OF THE INVENTION

The photofinishing system and method of the present invention enable the effective management of images and associated data from a variety of input sources. Moreover, automatic preparation of customer orders for a variety of output media and formats is also made possible.

To realize the advantages described above, in one form the invention comprises A photofinishing system for automatically processing image and associated image data pursuant to customer output requests. The system includes an order manager operative to receive and control processing of the output requests and at least one source of image related data corresponding to the output request. An input interface receives the image related data from the source and converts the data to a digital data stream. A memory is included for storing the digital data stream. The system further includes a data parser disposed in communication with the memory to extract selected data streams according to the order manager and to reduce the data into respective image files having respective groups of data fields. An output module is responsive to the order manager and is operative to produce a photofinished output organized with respect to the data fields.

In another form, the invention comprises a photofinishing method for automatically processing image and associated data in a photofinishing system pursuant to customer output requests. The method includes the steps of receiving batch requests for a specified output; accumulating data relating to the batch requests through an input interface; transforming the accumulated data into a digital data stream; interpreting and classifying the data into digital images and digital data fields; establishing correspondence between the digital images and associated digital data fields; and organizing the corresponding digital images and associated digital data files into the specified output.

Other features and advantages of the present invention will be apparent from the following detailed description when read in conjunction with the accompanying drawings.

BRIEF DESCRIPTION OF THE DRAWINGS

FIGS. 11A and 11B are respective pages of a look-up table compiled from the steps of FIG. 10;

FIG. 13 is a look-up table compiled from the steps of FIG. 12;

FIGS. 14A and 14B are respective pages of a look-up table compiled from the steps of FIG. 12;

FIGS. 15A and 15B are respective pages of a look-up table similar to FIGS. 14A and 14B;

DETAILED DESCRIPTION OF THE INVENTION

Figure 1:
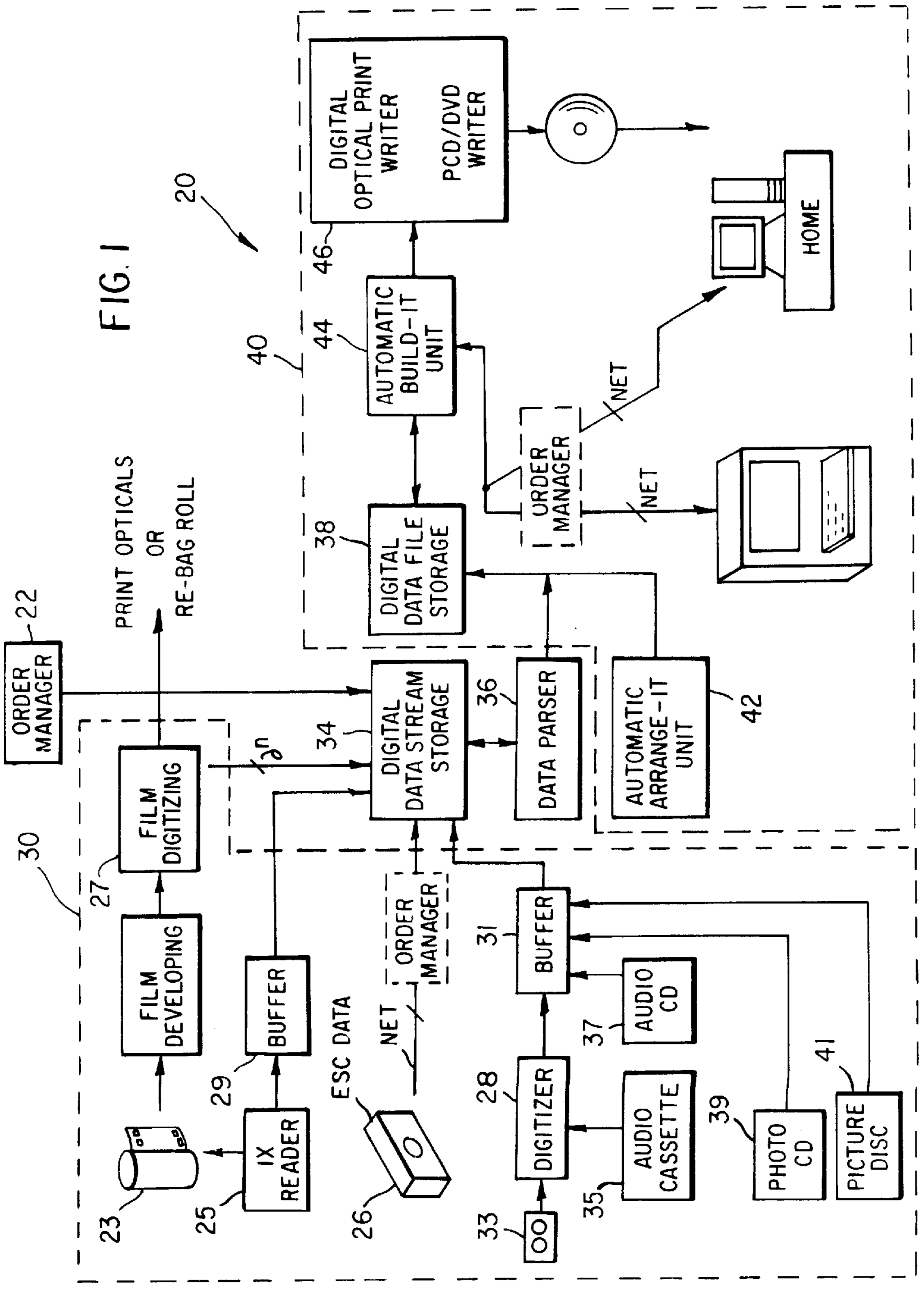
FIG. 1 is a block diagram of a photofinishing system according to one embodiment of the present invention.

Referring now to FIG. 1, the photofinishing system of the present invention, generally designated 20, provides an automatic and integrated means to carry out photofinishing services. The system includes an order manager 22 for controlling the processing of input information received by an input interface 30 to transform the multi-format data into a common format digital data stream. A data parser 36 separates and classifies the various types of data for packaging through an output interface 40 pursuant to requests received by the order manager.

Further referring to FIG. 1, the order manager 22 is coupled to a variety of customer order sources including telecommunication networks linked to digital cameras, remote kiosks, computers and scanners and operative to read order envelopes associated with film rolls and other storage media.

The input interface 30 cooperates with the order manager 22 in receiving input image and audio data from a variety of potential sources and in varying formats. Exemplary sources include conventional photographic film 23, advanced photo services (APS) film, camera film with data on integral media read by an IX media reader 25, and digital image and audio data from electronic still cameras (ESC) 26 or hybrid cameras with audio data on separate media, and similarly downloaded. Moreover, information from video and audio cassettes 33 and 35 as well as audio CDS 37, photo CDS 39, and picture discs 41 is envisioned.

Figures 1A, 8:
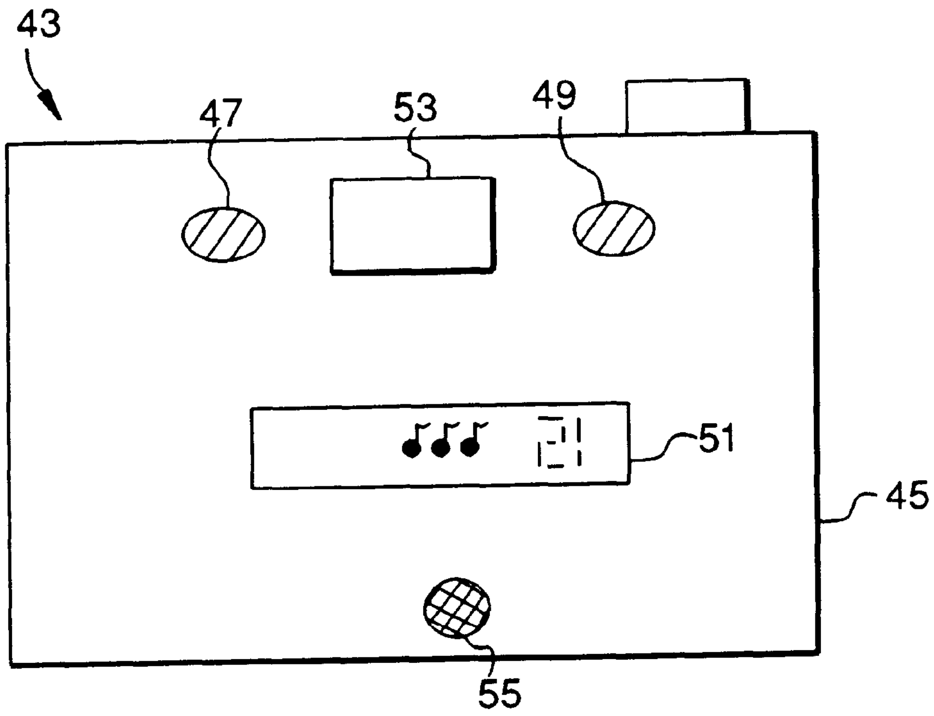
FIG. 1A is a rear view of one input source according to the present invention.
FIG. 8 is a look-up table for use with the steps of FIG. 6.

Referring now to FIG. 1A, a preferred input source especially suitable for use in the present invention comprises a camera 43 including a housing 45 that includes a back panel for mounting respective "Series Link" and "Promote to Lead" buttons 47 and 49. An LCD 51 disposed on the back panel beneath a viewfinder 53 communicates the image number and audio status to the user. Mounted adjacent the LCD is a microphone 55 for picking up audio signals related to captured images.

A film digitizer 27, video/audio digitizer 28 and buffers 29 and 31 transform each set of data into a digital data stream. The output of the input interface feeds a digital data stream storage unit 34 where the data stream information is retained in a mass memory at relatively high burst rates.

To create meaningful data files from the stored data stream, the data parser 36 processes input data from the data stream storage unit 34. The parser breaks down the data into a plurality of file-types, establishes decoding, calibration records, and creates interpreted digital image and audio files in a digital data file storage unit 38. The data file storage unit comprises a repository for formatted digital files while they are being organized for output.

The output interface 40 comprises a plurality of modules that organize image and, for example, audio data in a manner consistent with the requests received by the order manager 22. The output interface includes an automatic arrange-it unit 42 to begin the initial data compilation and organization to generate an organized image set. An automatic build-it unit 44 is disposed at the output of the arrange-it unit to receive the organized image set and complete the requisite formatting and encoding for the specified output media. A media writer 46, such as a digital film, paper or CD writer, is responsive to the build-it unit's formatting and encoding operations to write the image data to the specified output media.

Operation of the photofinishing system of the present invention proceeds according to steps carried out by each of the units described above, shown in FIGS. 2 through 4, that define the method of the present invention.

Figure 2:
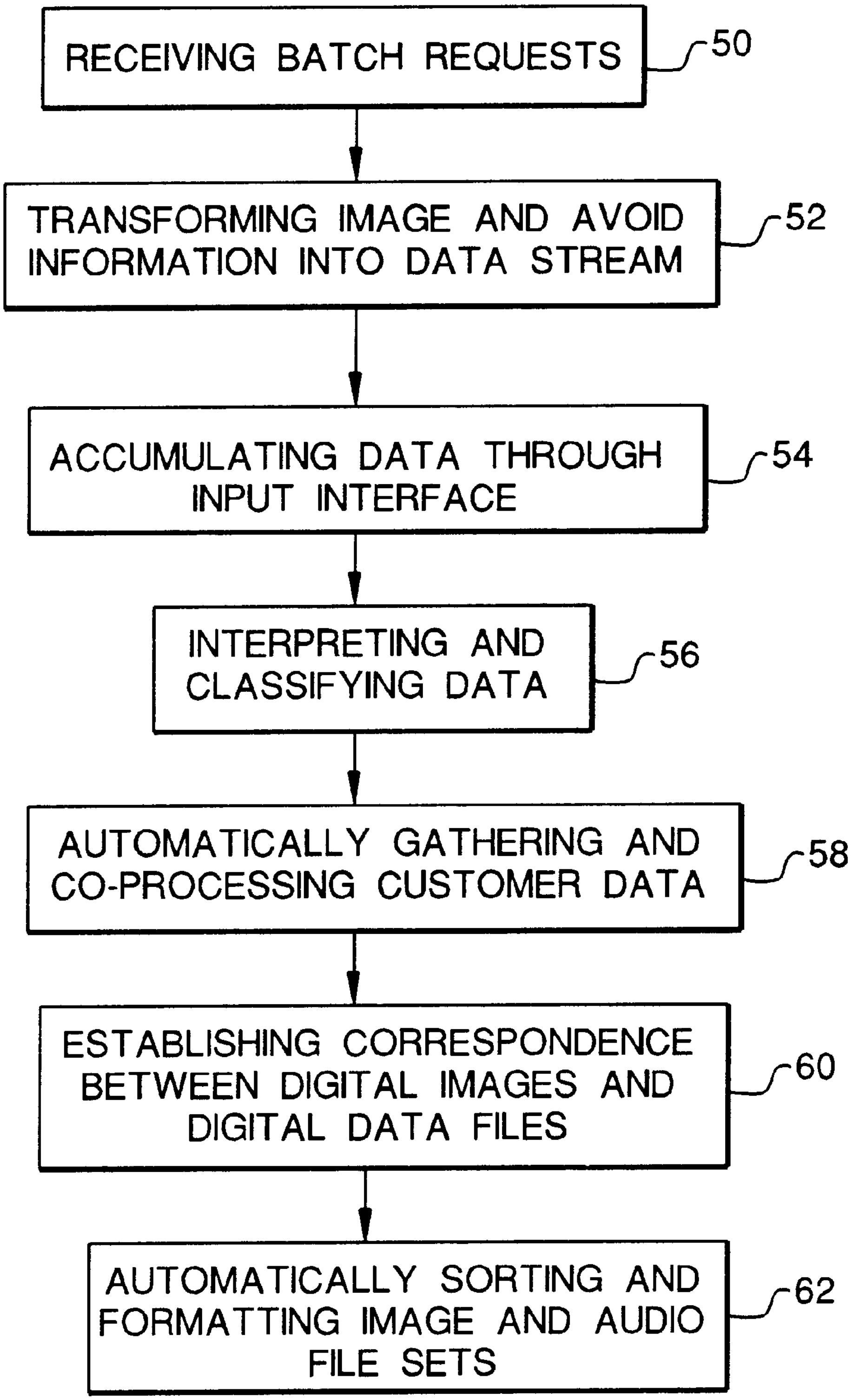
FIG. 2 is a block diagram of steps in a photofinishing method according to one embodiment of the present invention.

Referring now to FIG. 2, the method includes, generally, first receiving image batch requests with the order manager 22, at step 50, accompanying rolls of film or electronic files. The batch request may include a special code, hereafter referred to as a merge code, to join separate batches of images and their data, such as audio data. The input interface is employed, at step 52, to transform any non-digital image and audio information into a common format digital data stream. The transforming step is followed by accumulating digital data through the input interface 30, such as image and audio information, at step 54, associated with the image content. Additional information in the form of, for example audio data, may be within the roll of film or as part of the electronic file. An interpretation and classification of the data, is carried out by the parser 36, at step 56 to properly break down or reduce the data.

Following the step of interpreting the data, at step 56, the image and data content is then automatically gathered and co-processed by the automatic arrange-it unit 42, at step 58, for a specified customer or set of customers having submitted an identical merge code. A correspondence is established, at step 60, between digital images and digital data files, including audio data. Image and audio file sets are then automatically sorted. Finally, they are formatted by the automatic build-it unit 44, at step 62, for a selected output path.

Figure 3:
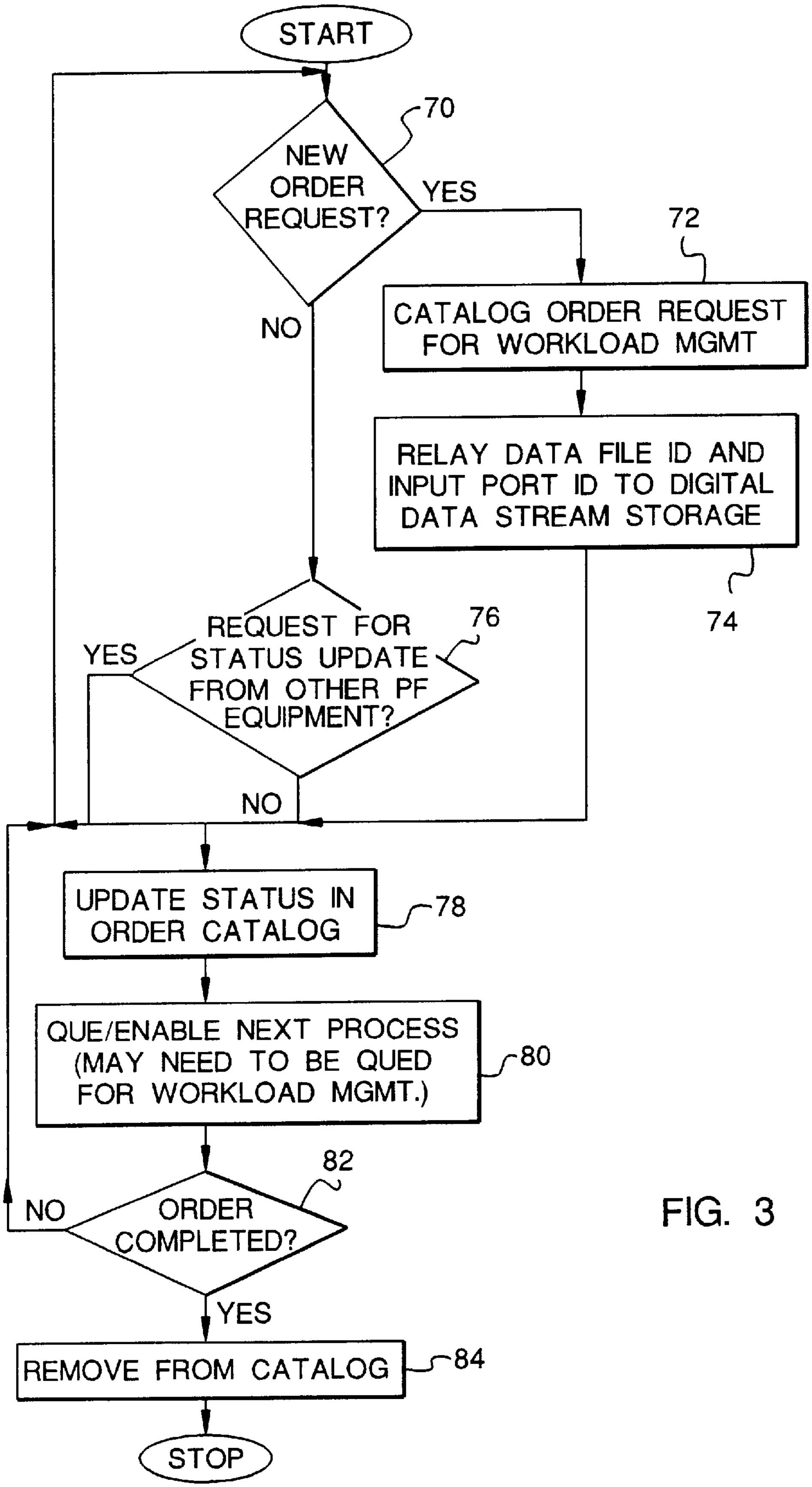
FIG. 3 is a block diagram of specific steps involved in the method of FIG. 2.

Specifically referring to FIGS. 2 and 3, the order receiving step 50 (FIG. 2) carried out by the order manager 22 includes several sub-steps that define the overall functionality of the order manager. The order manager alternates between checking for new incoming orders, at step 70, and managing the workflow of previously received orders among the peripherals, at step 76. If a new order is received, the request is catalogued, at step 72, for workload management. Such cataloguing may include identifying the customer name, address, services requested, job identification number, merge code, image status and the like. Based on the services requested, the order manager compiles a workflow sequence that is used to guide the overall process of advanced photofinishing. Each step will be completed in sequence. A data file ID and input port ID is then relayed, at step 74, to the digital data stream storage unit 34 where data input receiving ensues.

Peripheral units such as the data parser will notify the order manager when they are idle, at step 76. Should the order manager find no new incoming orders, it then manages the workload among the idle peripheral units. When idle, peripherals are assigned their next job by first updating the job status in the work order catalog, at step 78, and enabling the subsequent photofinishing process, at step 80. A determination is then made, at step 82, whether the order is complete by checking the steps remaining for the job in the order catalog. If no further processing is required, then the order has been delivered and the data is removed from the catalog, at step 84, at which time the order manager 22 concludes its operations for that specific order. If the order is incomplete, then the steps described above are repeated, beginning with step 70, until completion.

Figure 4:
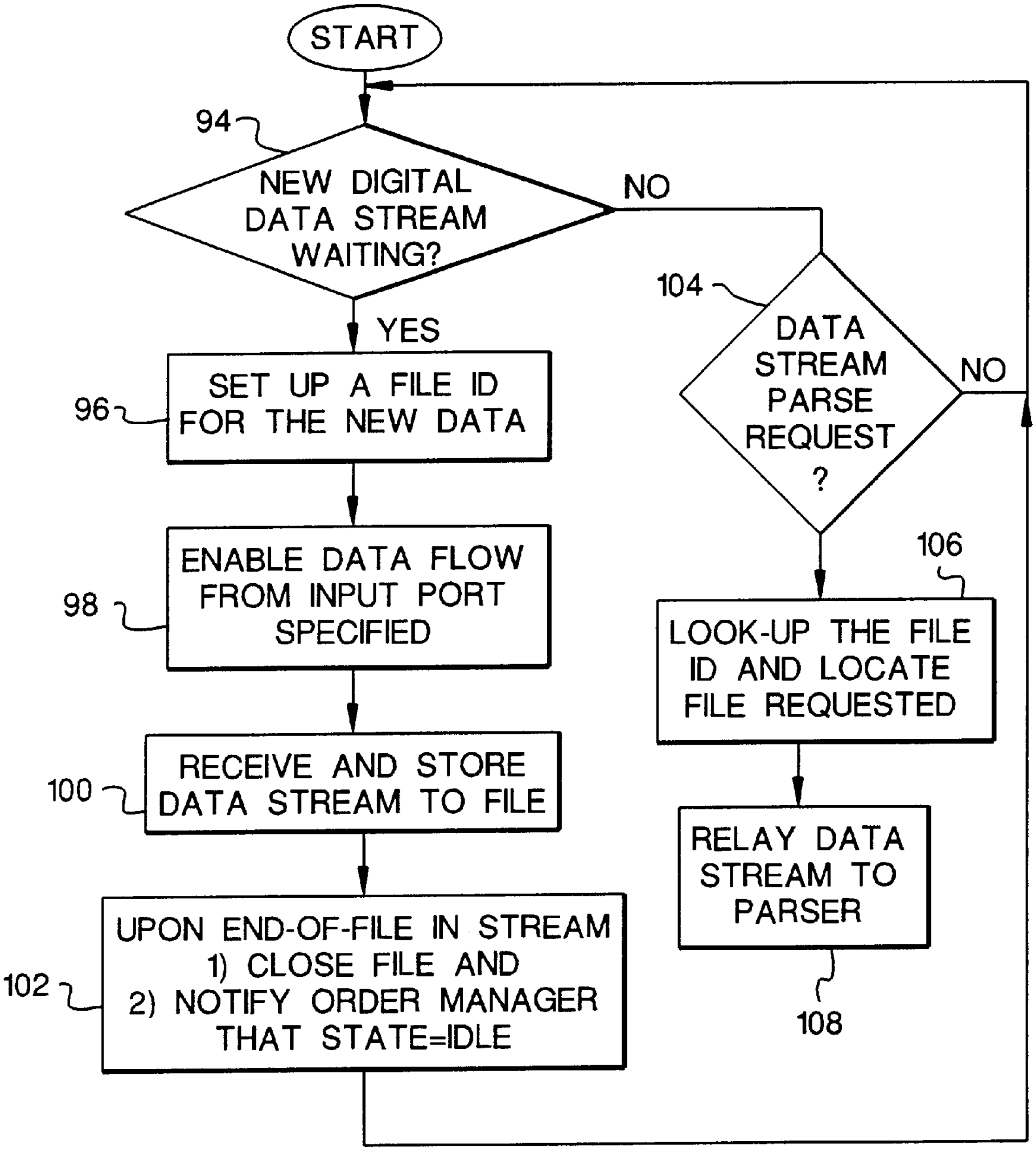
FIG. 4 is a block diagram of specific steps involved in the method of FIG. 2.

Referring now to FIGS. 2 and 4, the transforming and accumulating steps, 52 and 54 (FIG. 2) include first receiving notification by the order manager that a new data stream awaits processing, then setting up a file identifier in the digital data stream storage, collecting input data through the input interface 30 at step 94, from the input source, and storing the collected data.

Referring to FIG. 4, to continue the method of the present invention within the transforming step 52, a digitizer 27 or 28 is employed to convert nondigital data formats to a digital data stream. Of course, if the data source generates digital data, the transformation step is unnecessary. A file ID/locator index is setup for the data stream, at step 96. A specified input port is then enabled, at step 98, which allows the data stream to be received and stored in the storage unit as a file, at step 100. Upon receipt of an end-of-file marker, the status of the data file is then updated, at step 102, with the order manager 22.

If no data stream is in waiting, then the order manager 22 determines whether the parser 36 is busy. If not, the order manager enables the data parser to begin processing a particular data stream. When, at step 104, a parse request has been received by the storage unit, it then looks-up the index by order file ID, at step 106, and relays the specified data stream to the parser, at step 108. If a parse request has not been received, the storage unit notifies the order manager that it is idle and loops back to step 94.

Figure 5:
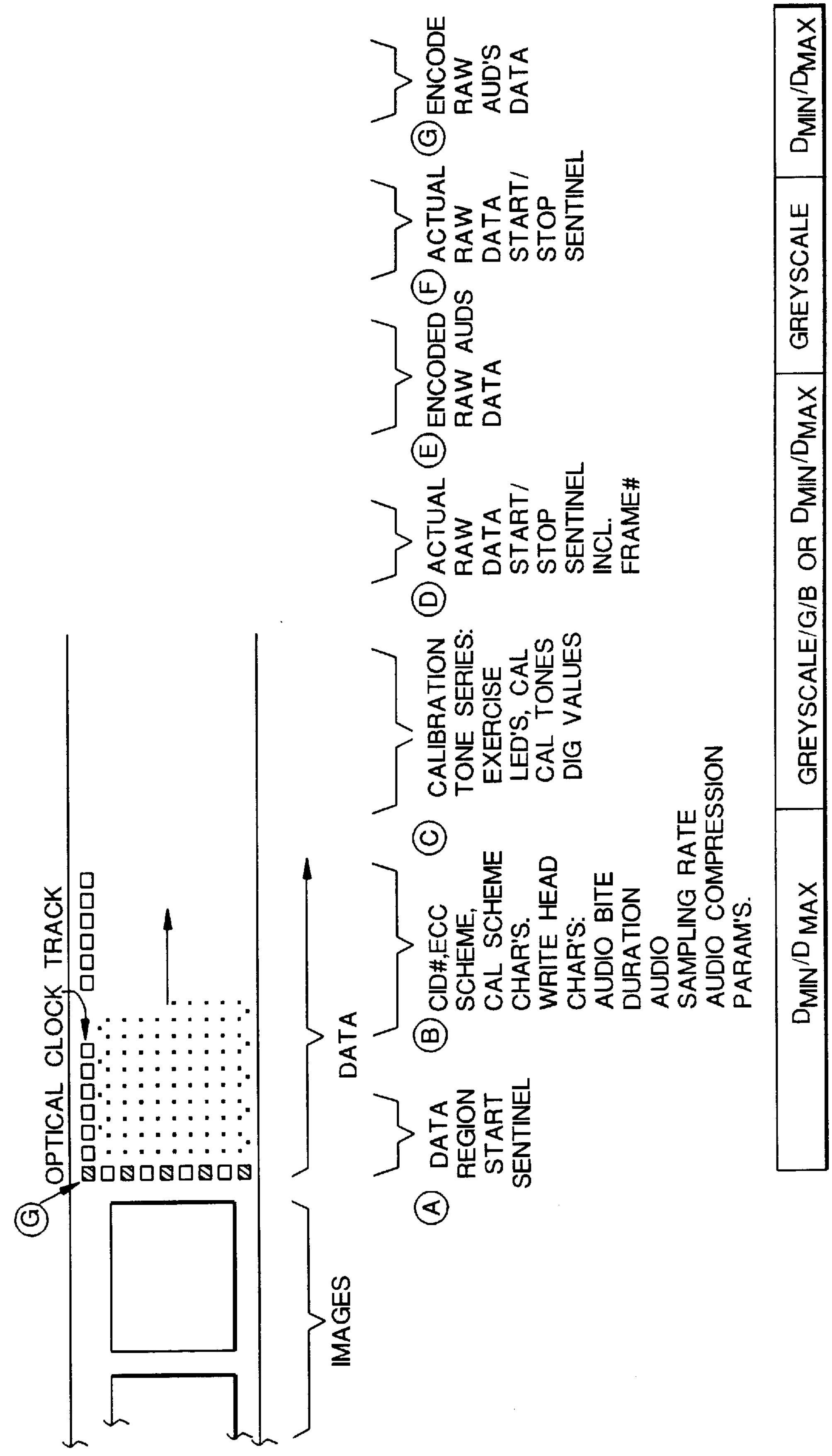
FIG. 5 is a schematic diagram of a strip of photographic film having latent image data.

An example of one of the more complex data formats captured on film and capable of being efficiently processed by the present invention is shown schematically in FIG. 5. The film includes a plurality of data fields A, B, C, D, and E, to robustly convey digital data as a latent image to a photofinisher. The first field A comprises a bi-level encoded data start sentinel that signifies that data following are not image data, but rather associated digital data. A bi-level code field B is written proximate to the start sentinel A and represents information specific to any particular image within the roll. The information may represent the cartridge identification number, the number of audio recordings that follow, and so forth. A tone series field C is included to enable photofinishing equipment to devise a transformation look-up table. In film systems, this serves to calibrate out variations due to power supply fluctuations, light emitter aging, and temperature effects.

Figure 6A:
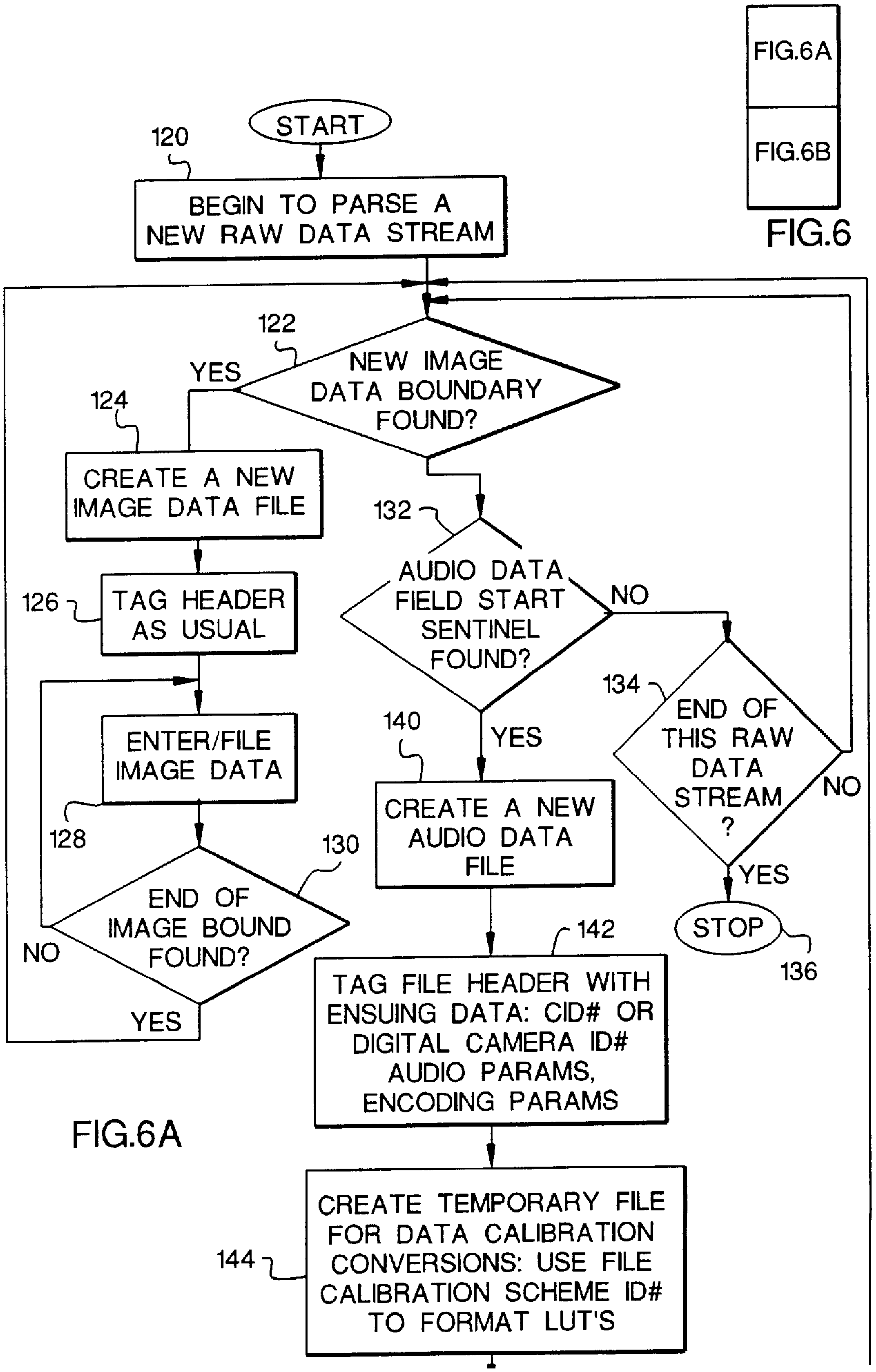
FIG. 6 is a block diagram of specific steps involved in processing the latent image data of FIG. 5.
Figure 6B:
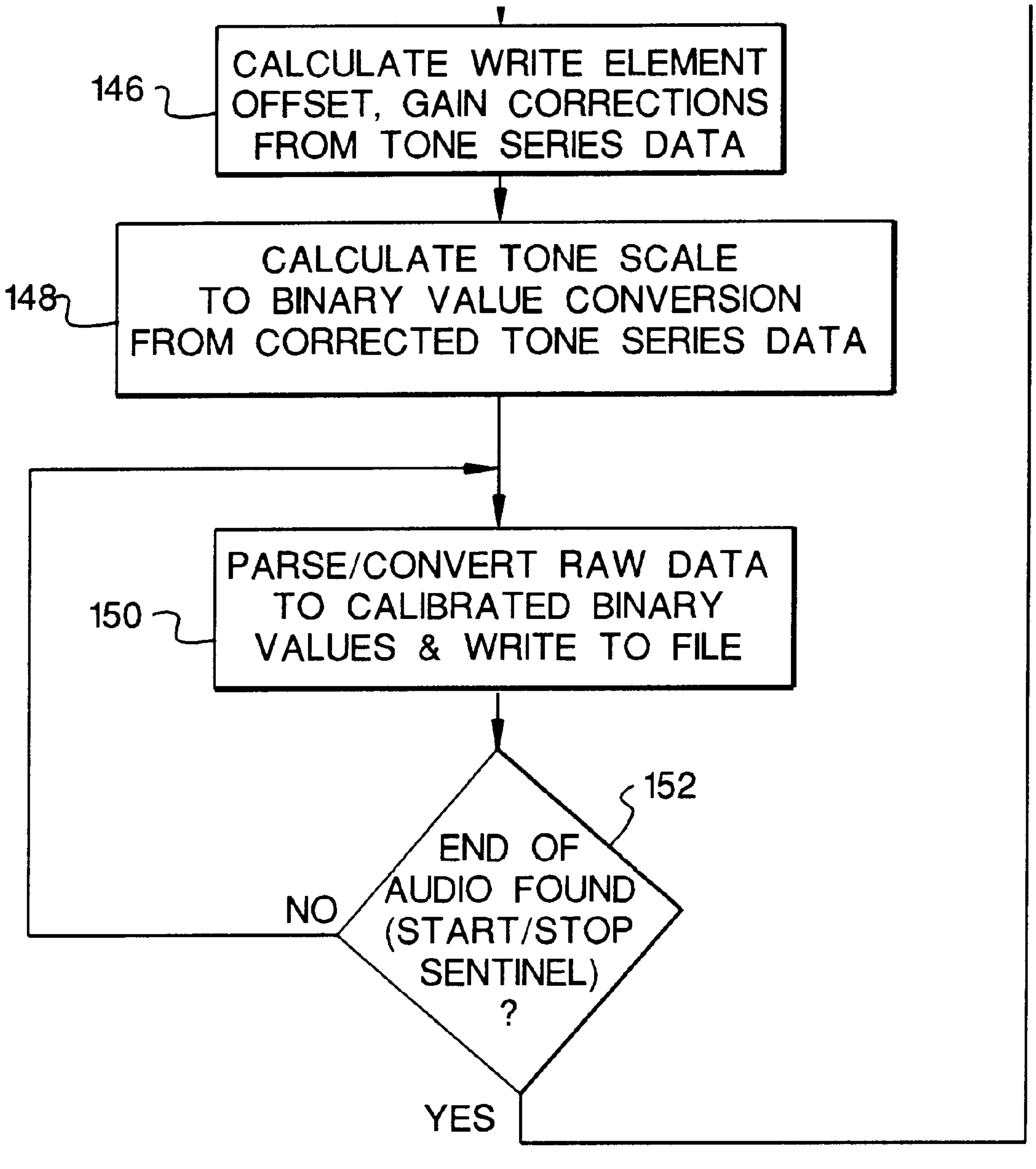

Additional data fields recorded on the film by the digital film writer may include a bi-level encoded start sentinel D, for an individual data field that may include replicated calibration tones, associated image frame numbers, metrics representing the length of the audio recording, and the like. Audio data content is conveyed by a binary coded digital data stream field E. This may be written as a $2^n$ tone series, which may have a border line of regularly occurring Dmax tones to assist with removing variability in the film transport speed and film position shifts. To signify the end of a data file, a bi-level encoded data start sentinel F is employed, which may also give information similar to field D for the next audio recording. Referring now to FIGS. 2 and 6, the interpreting and classifying step 56 (FIG. 2) includes a parsing procedure that breaks down the data in the data stream into usable components or files. An exemplary parsing procedure applied to the optical input data from film, such as the latent image data described above with respect to the accumulating step 54 (FIG. 2), involves first accessing the stored data stream with the parser 36, at step 120. The parser then determines whether an image data boundary is detected, at step 122. If a new boundary is found, a new image data file is created, at step 124, and the header tagged, at step 126. The file image data is then entered, at step 128 until the end of the image boundary is detected, at step 130.

Once the end of the image boundary is found, at step 130, the procedure returns to the determination, at step 122, of whether a new image data boundary is detected. If no image boundary is found, the parser 36 proceeds by determining whether an audio data field start sentinel is detected, at step 132. If no start sentinel is recognized, an inquiry is made whether the detected data is the end of the data stream, at step 134. If so, then the procedure stops, at step 136. If not, then the procedure loops back to step 122. If the start sentinel is detected at step 132, then a new audio data file is created, at step 140, and the file header is tagged with ensuing data such as the CID number or digital camera ID number and so forth, at step 142.

Figure 7:
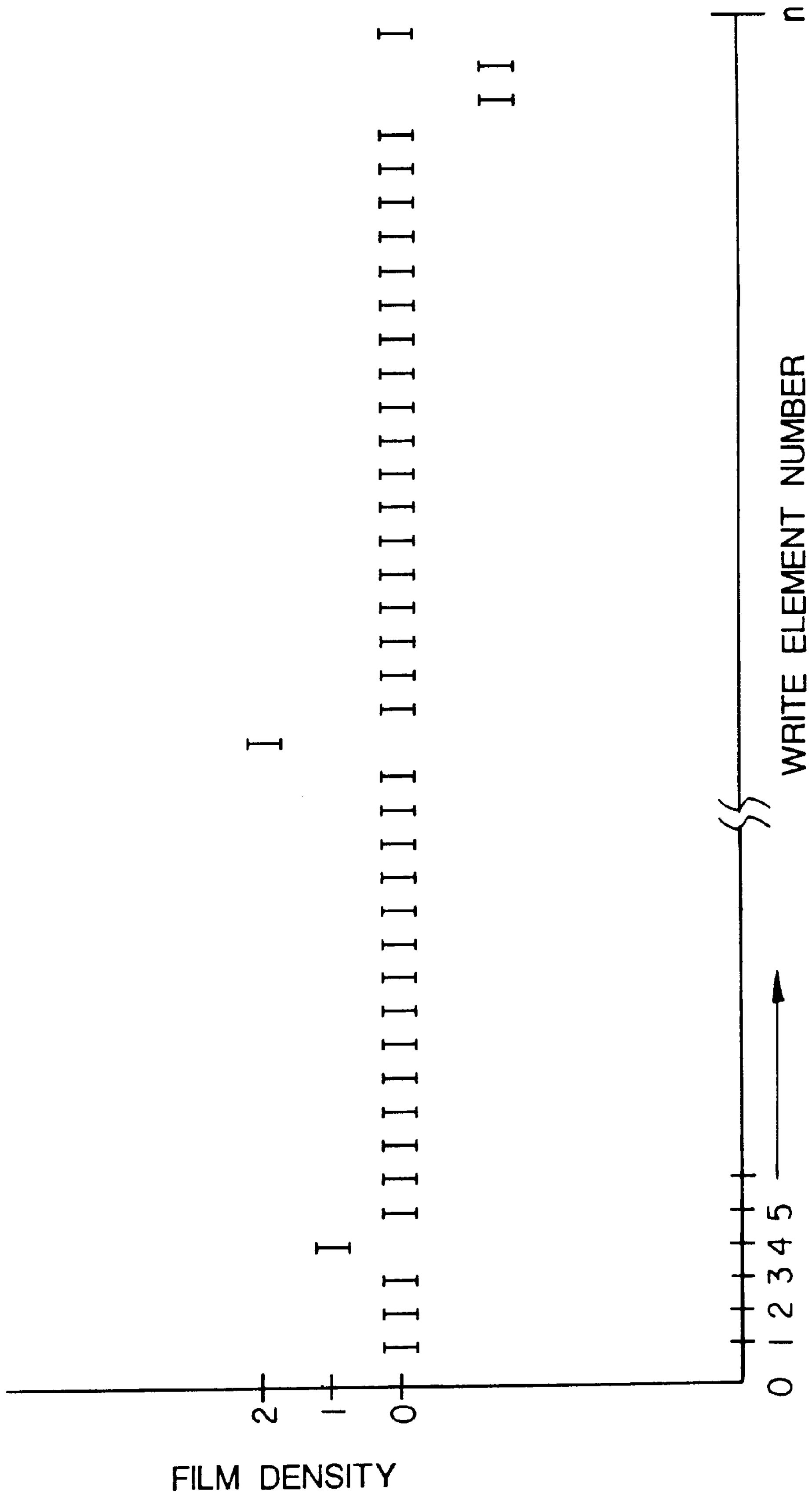
FIG. 7 is a graph of write element number versus film density.

The parsing operation then initiates a calibration process that involves first calibrating individual write elements of the film data writer, at step 144. Each writer element typically writes the same calibration tones, and as a result, the digital values scanned from the film are theoretically identical. However, due to writer head manufacturing variations, the values differ slightly. FIG. 7 comprises a graph of the digital film density readings from each film writer element for a single tone that may require both gain and offset corrections. The corrections may be determined by using the median value for each written tone as the reference value, then creating an error table by tone, for each writer element. A straightforward regression may be used to derive the offset and gain correction for each writer element. The resulting correction look-up table is depicted in FIG. 8.

Referring again to FIG. 6, following the step of calibrating the individual write elements at 144, a system calibration is carried out, at step 146, to eliminate any variations due to battery voltage, temperature and other influential effects.

Figure 9:
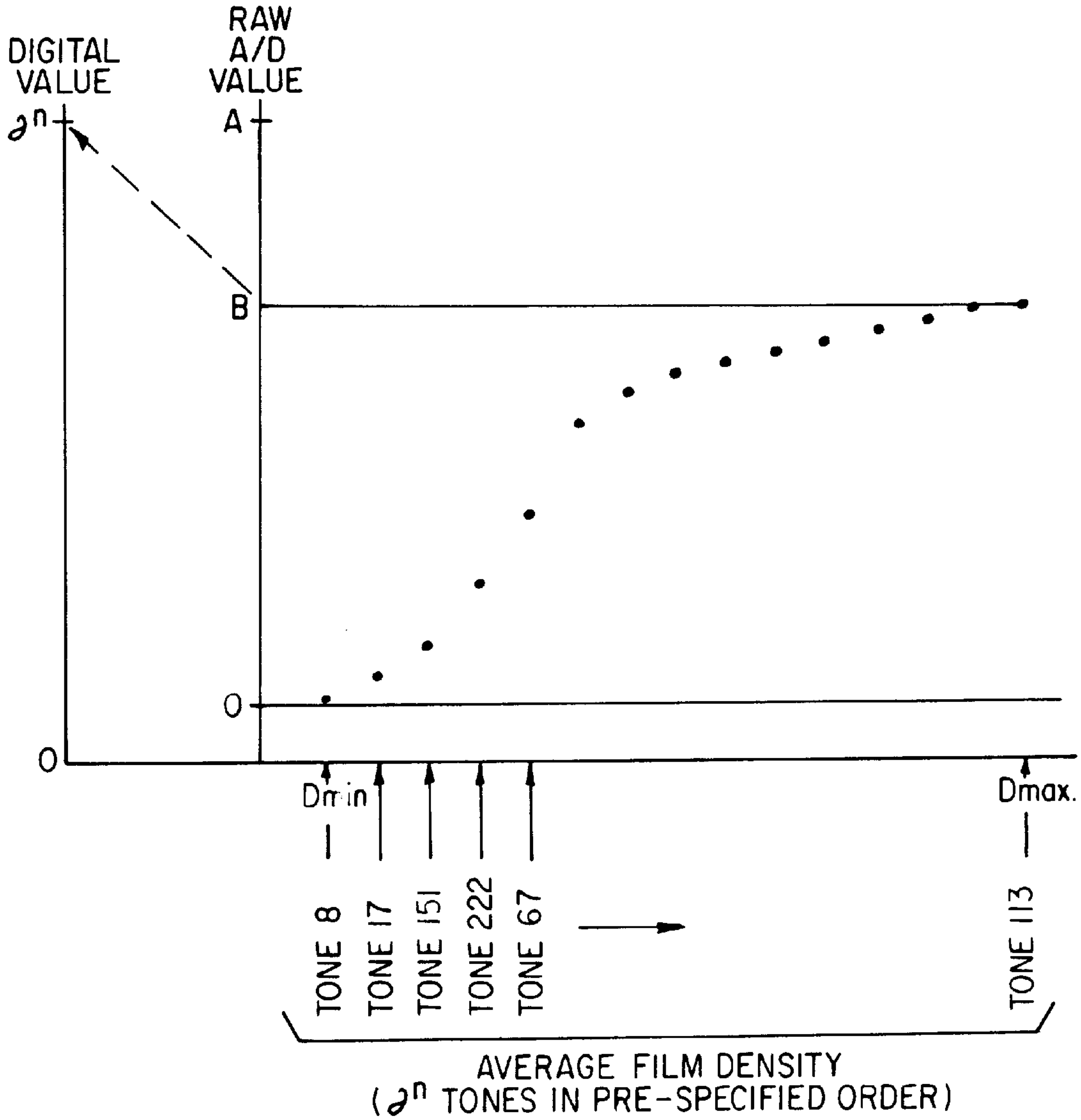
FIG. 9 is a graph of average film density sorted by increasing tone versus raw analog-digital code value.

The calibration ID scheme specifies the order in which each tone is written to film. Thus, a table may be created with two columns, one containing the ideal tonal values from the calibration ID specification, and the other containing the median digitized values from the previous step. FIG. 9 depicts this type of data graphically.

Once the calibration steps 144 and 146 are performed, the next operation involves rescaling the data, at 148, to span the full numerical range of potential output values. This may be carried out by satisfying the relation:

$$Vi'=(Vi-Vmin+Vnew\_min)(Vnew\_max-Vnew\_min)/(Vmax-Vmin)$$

where:

Vi=each raw data value

Vi'=each rescaled data value

Vmin=the smallest value in the raw data set

Vmax=the largest value in the raw data set

Vnew__max=the largest value of the resealed data; and

Vnew__min=the smallest value of the rescaled data

As the final part of the rescaling step 148, a regression curve fit is performed to transform the audio data back to the calibrated digital values.

Further referring to FIG. 6, following the curve fit, the raw audio data is then converted to calibrated binary values and written to a data file, at step 150. Each raw data value is first corrected for the writer element variation by using the correction values for the write element that wrote that datum. This is readily accomplished by applying the gain and offset correction from the look-up table illustrated in FIG. 8. Next, the data is corrected for system variability, using the second transform relationship developed in step 148. The regression equation derived from the tone scale calibration is then applied to data points to relate back to the actual original data value the camera intended to write. The converting step 150 continues until the audio data stop sentinel is detected, at step 152, at which time the procedure returns again to step 122. The parsing and calibration process is repeated until the data stream has been completely processed, reaching step 136.

The parsing procedure for other forms of data, such as image data from film combined with data from other media, and image data from digital input sources includes steps similar to those steps described above relating to optical data from film.

Figure 10:
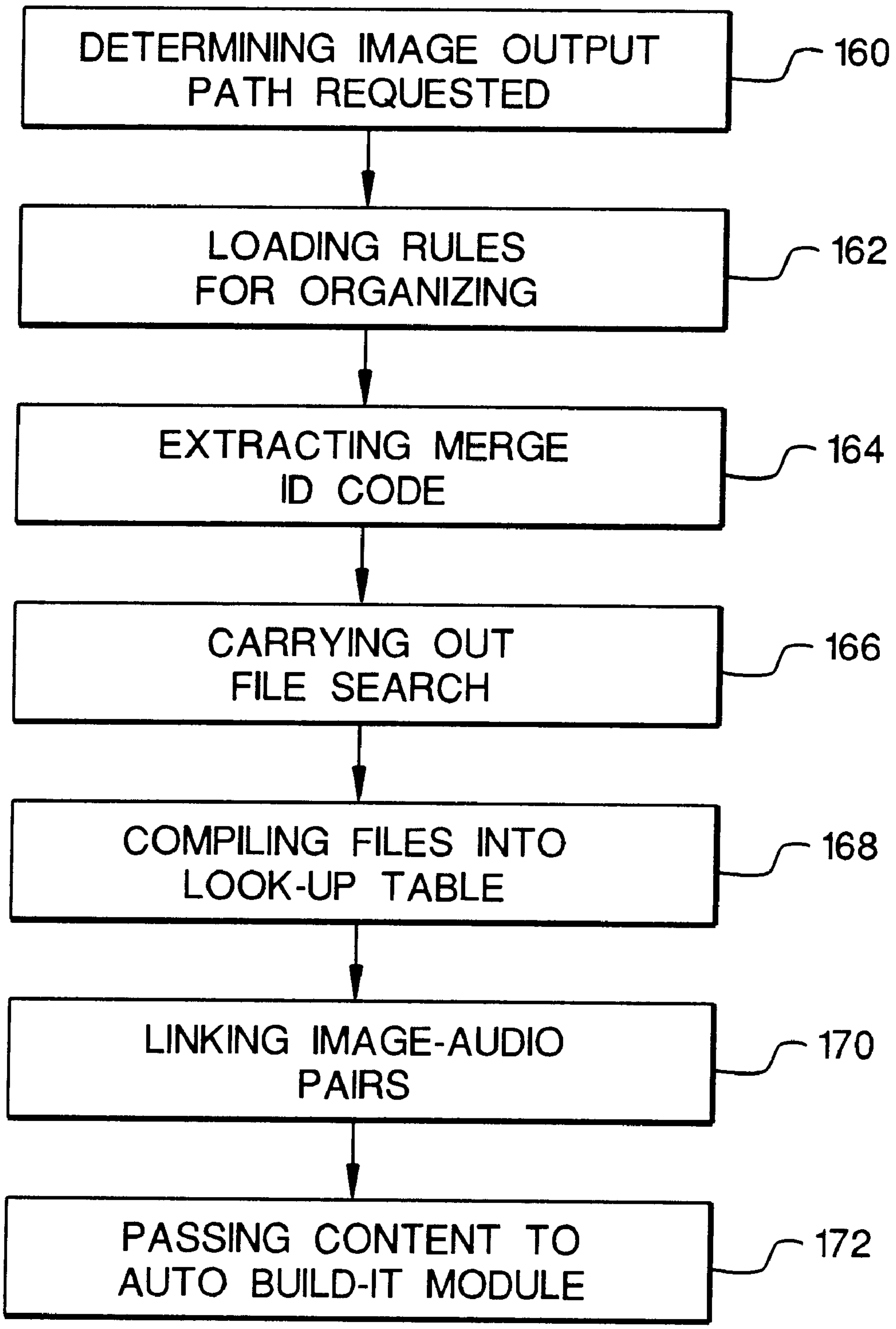
FIG. 10 is a block diagram of specific steps utilized in the method of FIG. 2.

Referring now to FIGS. 2 and 10, following the interpreting and classifying procedure 56 (FIG. 2) carried out by the parser 36, the photofinishing method continues with the steps of automatically gathering and co-processing customer data and establishing a correspondence between digital images and digital data files, at steps 58 and 60 (FIG. 2) with the auto-arrange-it organizer 42. Generally, this involves determining the type of image output path requested, at step 160 (FIG. 10), from the instruction of the order manager 22, and loading rules for organizing associated with the output path, at step 162. A merge identification code is then extracted, at step 164, which identifies all files to be included in the organization processing. A search is then carried out in the digital data file storage unit 34, at step 166, for files with the extracted merge ID code. Header content from all of the files retrieved from the search are compiled into a table, at step 168, with entries for each file to be included in the organization processing. Image-audio pairs are then linked, at step 170. They may be linked in an image centric scheme or an audio-centric scheme. To accomplish this, a number of sub-steps are necessary. Following organization of the table, the content is then passed, at step 172, to the auto-build-it module 44 (FIG. 1).

FIGS. 11A and 11B illustrate a correspondence table that might be constructed by the auto-arrange-it organizer 42 according to the general steps above. Various information fields are provided for each file relating to data from the origination source, and the user. For each file type, such as a JPEG, MPEG or WAV format file, respective fields containing information such as date and time, batch ID #, frame ID #, audio snippet duration, are included. For processing an image having, for example, camera captured audio, a JPEG file image format, and associated with corresponding audio data having a WAV file format, a convenient image-audio link field is provided to cross-reference the files to each other and maintain the camera-specified correspondence through the photofinishing processing.

Figure 12:
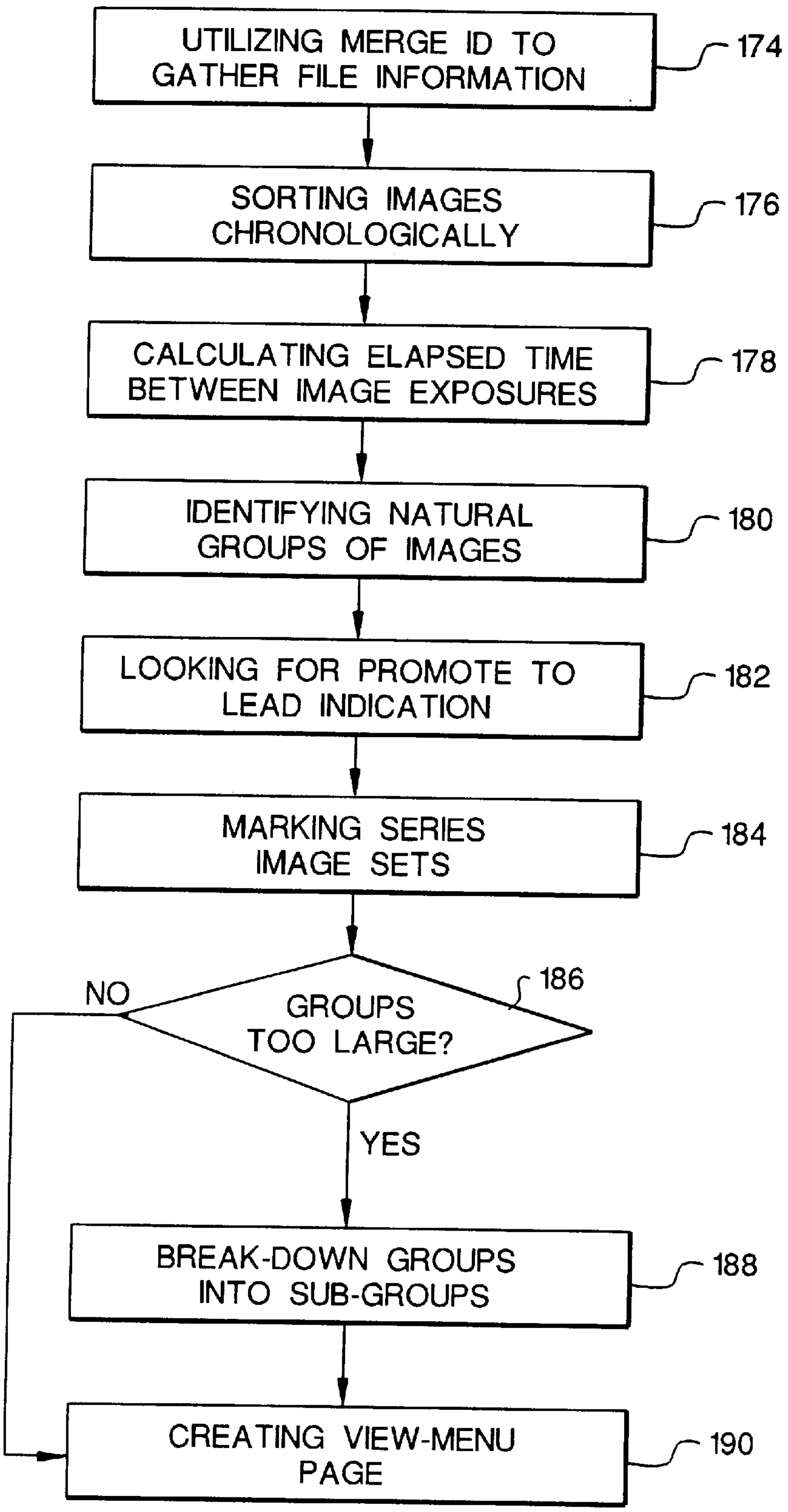
FIG. 12 is a block diagram of specific steps utilized in the method of FIG. 2.

With reference now to FIG. 12, after the correspondence table has been assembled, the information is then processed according to organizing rules loaded from the order manager 22. The steps for an image-centric auto-arrange it photofinishing service for a CD-ROM output, according to one embodiment of the auto-arrange-it method, involves first using the customer merge ID, at step 174, to gather information about the submitted order content, including images and audio. The images are then sorted into chronological order, at step 176, to obtain the table shown in FIG. 13. The chronological sort keys to the date and time of the image capture to interleave all image batches successfully.

Following the chronological sort, the elapsed time between image exposures is calculated, at step 178. This quantity is used to define each photographers normal time lapse pattern for the batch. The calculation may utilize a statistical measure to establish, for example, a standard deviation between picture to picture intervals. From this calculation, natural groups of images may be identified, at step 180, by photohabits and organized into an information table, such as that shown in FIGS. 14A and 14B. Each group is given a sequential image group ID number for utilization later by the auto build-it module 44 (FIG. 1).

The auto-arrange-it module 42 (FIG. 1) then looks within the identified groups for any "Promote to Group Lead" indication, at step 182 (FIG. 12). This information may be generated, for example, by the camera 43 having the selectable "Promote to Group Lead" button 49. A table showing such information may be constructed, as shown in FIGS. 15A and 15B. This is a straightforward scan and resequencing to move user-specified images out of chronological order to lead the natural group they are associated with. This step is particularly useful when the user wishes to have a CD-ROM created. The first image in each group generally serves as the visual navigation menu, so an image that best represents the group is ideal as the lead in each group. Further referring to FIG. 12, following the "Promote to Group Lead" determination, series image sets are marked, at step 184, by looking for a series link signal from a camera user or by noting sets of images with statistically short inter-picture intervals or by noting groups where image content has a strong data correlation. Series images are linked such that the playback delay time is reduced to create an effect of connectivity. FIGS. 15A and 15B illustrate a table showing the usersignaled and the automatic series tool. The column labeled "Series?" has a "Y" denoted in the table for images that were taken with an interval significantly shorter than the natural batch standard interval. For the examples listed in FIGS. 15A and 15B, the threshold for automatically connecting as a series was an interval under ⅛ the standard deviation of the average inter-picture interval. For batch 572022, images taken at intervals under 2.44 minutes were linked. For batch 571349, images taken at intervals under 8.04 minutes were linked.

Figure 16:
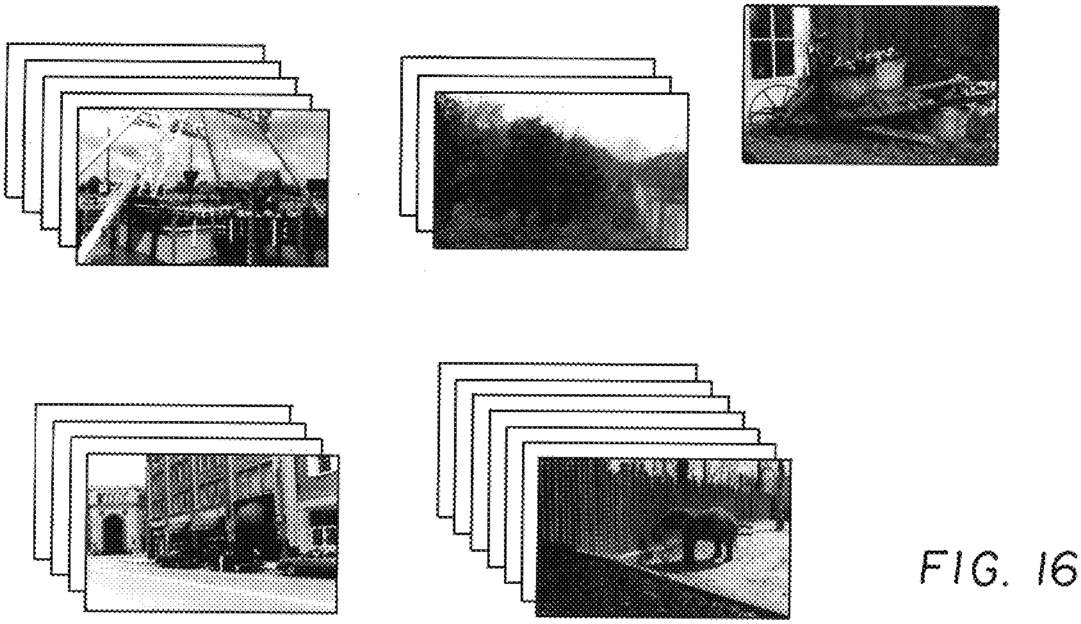
FIG. 16 is a view menu page created from the steps of FIG. 12.

Following the series images marking step 184, a determination is made whether the number of images within specific groups is too large, at step 186. If a group is too large, the group may be optionally broken, at step 188, into a number of sub-groups for quicker image location when visually searching. To navigate the CD contents, a view-menu page is created, at step 190, for the user. The page displays the pictures in groups, as shown in FIG. 16. The organization is then completed and the table is then stored in the digital data file storage unit 34 for subsequent CDROM burning.

Alternatively, user specified categories may be utilized to organize the sequence and groupings of images. The general approach is similar to the image-centric case described above, but involves a category sort operation following the chronological sort step 176 (FIG. 12). Additionally, for high density media, such as a digital video disc (DVD), the image sorts can be saved in chronological groups and natural groups, as well as the user-specified categories.

Figure 17:
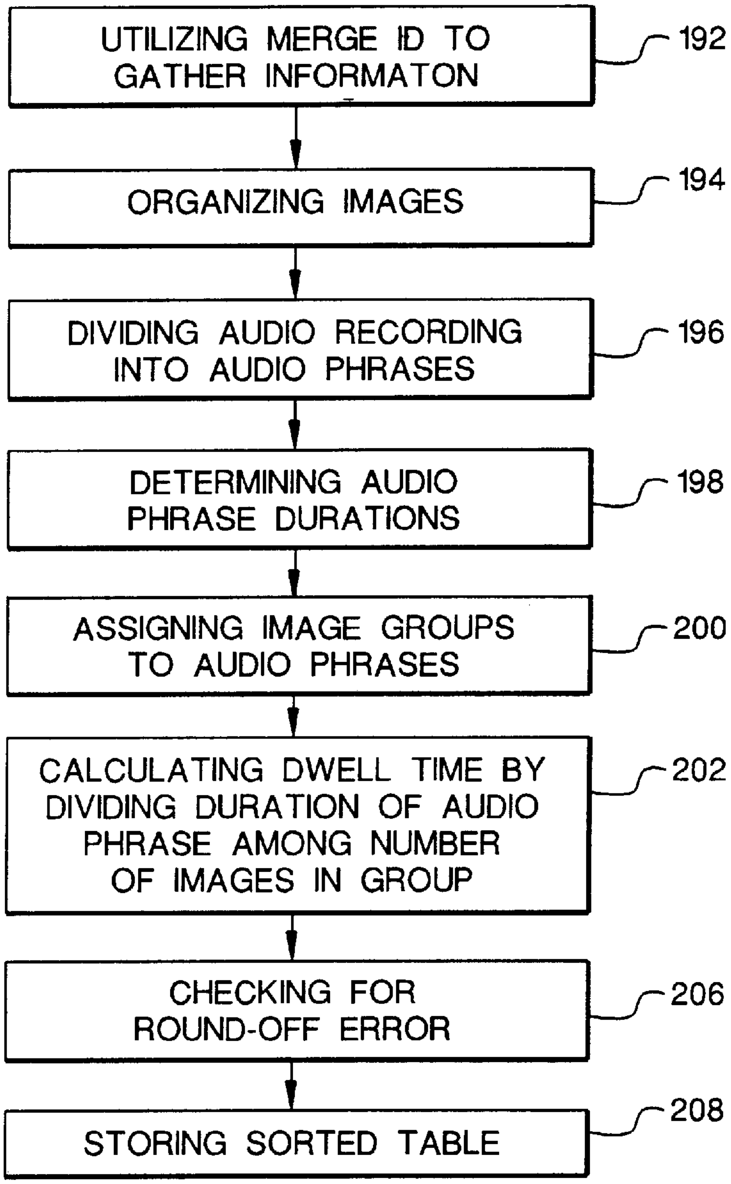
FIG. 17 is a block diagram of specific steps utilized in the method of FIG. 2.

A further specific application for the auto-arrange-it module 42 involves audio-centric processing especially useful in the case of images with longer audio background soundtracks. Referring now to FIG. 17, the procedure begins by using the merge ID to gather file information, at step 192, for all of the submitted order content. The resulting table is similar to that described previously. The images are then organized, at step 194, as previously described in steps 176 through 184 of FIG. 12.

Following the image organizing step 194, the audio information is then organized. This involves first dividing each audio recording into audio phrases, at step 196. It is usually desirable to ensure that an image change will occur on a beat or at the end of a phrase. This may be done by analyzing the audio data versus time with an audio-oriented tool, many of which are MIDI-based and well known in the art. The durations of the audio phrases are then determined, at step 198. Each image group is then chronologically assigned to each corresponding chronological audio phrase, at step 200. Following the respective assignments, the dwell time for each image group within its audio phrase is calculated, at step 202 by dividing the total duration or play time of an audio phrase among the number of images in the group, taking into account the dwell time adjustment if images are denoted for series playback. The dwell times are then summed for the images in the group to check for round-off error, at step 206. The last image may be adjusted to match the end of the audio phrase, if necessary to complete the sorted table. The procedure concludes by storing, at step 208, the sorted table in the digital data file storage 38.

Figure 18:
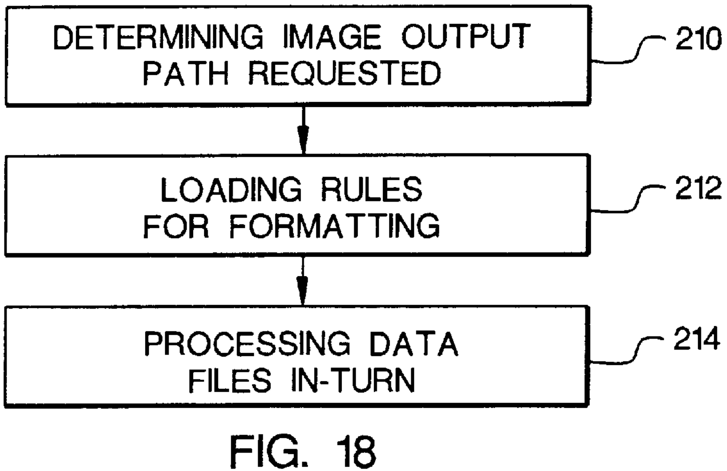
FIG. 18 is a block diagram of specific steps utilized in the method of FIG. 2.

The tables organized by the auto-arrange-it unit 42 are utilized by the auto-build-it unit 44 to process the output requested by the consumer. Referring now to FIG. 18, the steps performed by the unit include, generally, first determining the type of image output path requested, at step 210 from the information provided by the order manager. Rules are then loaded, at step 212, for formatting associated with the requested output path. The auto-build-it unit then accesses and utilizes the organization table, processing each specified data file in turn, at step 214. This may include creating header files, data files, intra-file linkage pointers and file to template linkages, dependent on the output desired.

Figure 19A:
FIGS. 19A and 19B are representative output results from the steps of FIG. 18.
Figure 19B:
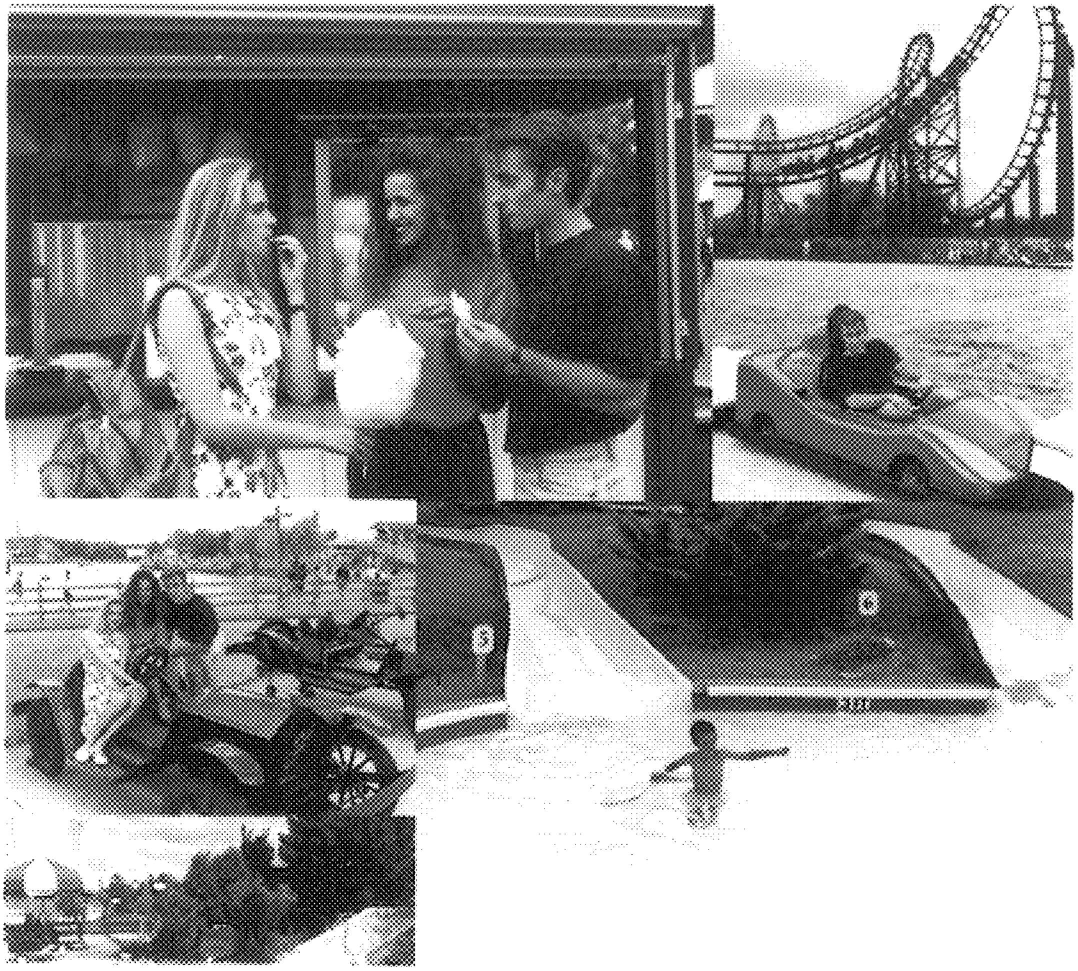

The general auto-build-it procedure described above is especially advantageous in producing collages of images, as illustrated in FIGS. 19A and 19B. Consistent with the steps outlined above, the auto-build-it module selects or creates a collage template with a number of image slots corresponding to the images in the customer order. The number of groups in the customer's image set may be used to specify how many large slots there are in the template. The images are then linked to the template, with the lead image in each group assigned to a large slot and the subsequent images in each group assigned to the surrounding slots. After linking, each image is resealed to the correct size for its assigned slot. Any customer requested title is added in and the order is then image processed to shape the tone scale and color gamut appropriate for hard copy or soft copy viewing. If the customer has requested to preview and approve the result before printing, the collage image is saved in the digital data file storage 38. The order manager 22 then e-mails an electronic copy to the customer at their home computer IP address or a neighborhood kiosk, as requested.

If the output request comprises a variety of CD-ROM, the appropriate formatting is utilized to build the CD-ROM content. This formatting is well known in standards for multimedia CD-ROMS and DVDs. It's file structure usually includes an appropriate content directory and navigational instructions along with image files in PhotoCD, FlashPix or other format and audio files in AIFF, WAV or other format. Start-up application software is also usually included on the disk.

Should the requested output comprise a traditional set of prints, chronologically arranged, the build-it module completes the digital image processing required to convert the image from scanned negatives to printable densities that will drive a digital printer. This is also well known in the art. It typically involves the steps of inverting the image, adjusting the tone scale and color balance, and the like.

If the output is a slide show for soft copy viewing or online photo albums, the images are similarly processed for soft copy display. The audio files are formatted according to computer-playback format requirements, following standards formats such as AIFF or WAV. The order manager 22 directs any intermediate output for user approval or modification as well as the final output and delivery of the customer order. It manages the interaction with the billing system subsequently and releases disk space in the digital data stream storage 34 and the digital data file storage 38 once orders have been completed.

Those skilled in the art will appreciate the many benefits and advantages offered by the present invention. One important advantage involves the capability of managing and sequencing audio data integrated with images in a photofinishing system and method. Additionally, the present invention provides the feature of managing and sequencing groups of orders for photofinishing services that result in an integrated image and audio product.

While the invention has been particularly shown and described with reference to the preferred embodiments thereof, it will be understood by those skilled in the art that various changes in form and detail may be made therein without departing from the spirit and scope of the invention.

PARTS LIST

20 Photofinishing system
22 Order manager
23 Conventional photographic film
25 IX media reader
26 Electronic still camera
27 Film digitizer
28 Video/Audio digitizer
29 Buffer
30 Input interface

31 Buffer
33 Video cassette
34 Data stream storage unit
35 Audio cassette
36 Data parser
37 Audio CD
38 Digital data file storage unit
39 Photo CD
40 Output interface
41 Picture disc
42 Automatic arrange-it unit
43 Camera
44 Automatic build-it unit
45 Housing
46 Media writer
47 Series link button
49 Promote to lead button
50 Receiving step
51 LCD
52 Transforming step
53 Viewfinder
54 Accumulating step
55 Microphone
56 Interpreting and classifying step
58 Automatic gathering and co-processing step
60 Establishing correspondence step
62 Formatting step
70 Checking step
72 Cataloguing step
74 Relaying step
76 Managing step
78 Updating step
80 Enabling step
82 Determining step
84 Removing step
94 Collecting step
96 Setting-up step
98 Enabling step
100 Receiving step
102 Updating step
104 Receiving step
106 Looking-up step
108 Relaying step
120 Accessing step
122 Determining step
124 Creating step
126 Tagging step
128 Entering step
130 Detecting step
132 Determining step
134 Inquiring step
136 Stopping step
140 Creating step
142 Tagging step
144 Initiating step
146 Calibrating step
148 Rescaling step
150 Converting step
152 Detecting step
160 Determining step
162 Loading step
164 Extracting step
166 Searching step
168 Compiling step
170 Linking step
172 Passing step
174 Using step
176 Sorting step
178 Calculating step
180 Identifying step
182 Looking step
184 Marking step
186 Determining step
188 Breaking step
190 Creating step
192 Using step
194 Organizing step
196 Dividing step
198 Determining step
200 Assigning step
202 Calculating step
206 Summing step
208 Storing step
210 Determining step
212 Loading step
214 Processing step
A First data field
B Bi-level code field
C Tone series field
D Bi-level encoded start sentinel
E Digital data stream field
F Data start sentinel

What is claimed is:

1. A photofinishing system for automatically processing images from image related data in terms of image content and the content of non-image data associated with an image pursuant to customer output requests, said system including:

an order manager operative to receive and control processing of said output requests;

at least one source of image related data corresponding to said output request;

an input interface for receiving said image related data from said at least one source and converting said data to a digital data stream;

a memory for storing said image related data;

a data parser disposed in communication with said memory to extract selected data from said data stream according to said order manager and assemble said extracted data into respective files corresponding to image data and non-image data each having respective groups of data fields; and an output module responsive to said order manager and operative to produce an output organized with respect to said data fields.

2. A photofinishing system according to claim 1 wherein said at least one source of image related data includes:

photographic film;

a film developer for processing said film into image negatives; and a film digitizer to convert said respective image negatives into digital data.

3. A photofinishing system according to claim 2 wherein said photographic film comprises hybrid film having audio image information written on said film, said at least one source of image related data further including an IX reader.

4. A photofinishing system according to claim 1 wherein said at least one source of image related data includes:

electronic image data.

5. A photofinishing system according to claim 1 wherein said at least one source of image related data includes:

at least one input from the group comprising a video cassette tape and an audio cassette tape; and a digitizer for converting said at least one input to digital form.

6. A photofinishing system according to claim 1 wherein said at least one source of image related data includes:

at least one digital input from the group comprising an audio CD and a photo CD and a picture disc.

7. A photofinishing system according to claim 1 wherein said output module includes:

an auto-arrange it unit responsive to said data parser to organize said extracted data fields into tables.

8. A photofinishing system according to claim 7 wherein said output module further includes:

an auto-build-it unit operative to package said image and associated audio data according to said tables.

9. A photofinishing method for automatically processing image data and associated data in a photofinishing system pursuant to customer output requests, said method including the steps of:

receiving a batch of requests, each request being for a specified similar output;

accumulating data relating to each of said batch of requests through an input interface;

interpreting and classifying said accumulated data into digital images and digital data fields each associated with an image;

establishing correspondence between said digital images and digital data fields; and organizing said corresponding digital images and digital data fields into said specified output.

10. A photofinishing method according to claim 9 and further including the step of:

transforming said accumulated data into a digital data stream.

11. A photofinishing method according to claim 9 wherein said organizing step includes the step of:

automatically gathering and co-processing customer data.

12. A photofinishing method according to claim 9 wherein said organizing step includes the step of:

identifying a merge code associated with respective separate orders of said batch of orders; and automatically gathering and co-processing customer data from separate orders according to said merge code.

13. A photofinishing method according to claim 9 wherein said organizing step includes the step of:

automatically sorting and formatting image and audio file sets from said digital data stream.

14. A photofinishing method according to claim 9 wherein said organizing step includes the step of:

automatically establishing correspondence between multiple data streams and origins.

15. A method of processing latent image tonal information recorded on photographic film by one or more write elements, said method including the steps of:

developing said film to generate respective image information;

transforming said image information into a digital data stream;

parsing said information into respective parameter data recorded by said respective write elements;

calibrating said respective write elements to compensate for variations;

resealing said data to span a predetermined full numerical range of potential output values; and fitting said data along a predetermined regression function to transform said information back to calibrated digital values.

16. A method of processing latent image information according to claim 15 wherein said calibrating step includes the step of:

correcting for said respective write element gain and offset parameters.

17. A method of processing latent image information according to claim 16 wherein said correcting step includes the steps of:

determining median values for said tonal information;

creating an error table for said tonal information; and deriving said offset and gain correction from said table.

18. A method of processing latent image information according to claim 15 wherein said calibrating step includes the step of:

correcting for said write element variations.

19. A method of processing latent image information according to claim 18 wherein said correcting step includes the steps of:

creating a table of ideal tonal values and median digitized values; and deriving said corrected operating parameter values from said table.

20. A method of automatically organizing image content according to an order for a requested image output path and a photofinishing service style, said method including the steps of:

determining the type of requested image output path requested;

loading rules for organizing associated with said requested output path;

gathering images identified with said photofinishing service style request;

linking data associated with said images to form an organized content table; and processing said organized content table to develop said requested image output path.

21. A method of automatically organizing image content according to claim 20 wherein said step of processing includes the step of:

automatically gathering and co-processing customer data.

22. A method of automatically organizing image content according to claim 20 wherein said linking step includes the steps of:

identifying a merge code associated with respective separate orders; and automatically gathering and co-processing customer data from separate orders according to said merge code.

23. A method of automatically organizing image content according to claim 20 wherein said processing step includes the step of:

automatically sorting and formatting image and audio file sets.

24. A method of automatically organizing image content according to claim 20 wherein said processing step includes the step of:

automatically establishing correspondence between multiple data streams and origins.

25. A method of automatically organizing image content according to claim 20 wherein said processing step includes the step of:

organizing image content based on user-specified categories.

26. A method of automatically organizing image content according to claim 20 wherein said processing step includes the step of:

organizing image content based on the chronology of picture taking and statistics of inter-picture intervals.

27. A method of automatically organizing image content according to claim 20 wherein said processing step includes the step of:

organizing image content based on devising natural groups of pictures from inter-picture interval statistics.

28. A method of automatically organizing image content according to claim 20 wherein said processing step includes the step of:

organizing image content based on modifying image playback duration based on a perceived series.

29. A method of automatically organizing image content according to claim 20 wherein said processing step includes the step of:

organizing image content based on overriding the predetermined picture sequence when a promote to lead request is detected.

30. A method of automatically organizing image content according to claim 20 wherein said loading rules step includes the step of:

implementing audio-centric procedures for said processing step.

31. A method of automatically organizing image content according to claim 20 wherein said loading rules step includes the step of:

implementing image-centric procedures for said processing step.

* * * * *